United States Patent [19]

Nakamura et al.

[11] Patent Number: 4,548,739
[45] Date of Patent: Oct. 22, 1985

[54] HIGH DENSITY INFORMATION RECORDS MADE OF CONDUCTIVE RESIN COMPOSITIONS COMPRISING A SPECIFICALLY-TREATED VINYL CHLORIDE-BASE RESIN

[75] Inventors: Mutsuaki Nakamura; Kazuhira Namikawa, both of Yokohama; Toshikazu Goshima, Sagamihara; Toshiaki Hamaguchi; Akio Kuroda, both of Yokohama; Akio Hata; Noriki Fujii, both of Shinnanyo, all of Japan

[73] Assignees: Victor Company of Japan, Ltd.; Tokuyama Sekisui Industry Corporation, Ltd., both of Japan

[21] Appl. No.: 601,098

[22] Filed: Apr. 17, 1984

[30] Foreign Application Priority Data

Apr. 20, 1983 [JP] Japan ................................. 58-68437

[51] Int. Cl.[4] .............................................. H01B 1/06
[52] U.S. Cl. .................................... 252/511; 369/288; 358/342; 523/174

[58] Field of Search ............... 252/511, 510; 524/495, 524/496, 527, 439; 523/174; 358/342, 344; 369/276, 280, 288, 126, 128; 428/64, 65; 526/200, 201, 202, 203; 346/137

[56] References Cited

U.S. PATENT DOCUMENTS

| | | | |
|---|---|---|---|
| 4,267,084 | 5/1981 | Mizutani et al. | 524/527 |
| 4,280,941 | 7/1981 | Datta et al. | 252/511 |
| 4,351,747 | 9/1982 | Miyamoto et al. | 252/511 |
| 4,412,941 | 11/1983 | Probst et al. | 252/511 |

Primary Examiner—Josephine L. Barr
Attorney, Agent, or Firm—Lowe, King, Price & Becker

[57] ABSTRACT

A high density information record of the electrostatic capacitance type comprising a record substrate on which signal information is recorded as geometric variations. The record substrate is made of a conductive resin composition comprising a vinyl chloride resin and a conductive powder. The vinyl chloride resin is obtained by suspension polymerization of starting vinyl chloride monomer in an aqueous solution of a water-soluble polymer suspension stabilizer from which insoluble organic matters with sizes over 10 $\mu$m have been removed.

9 Claims, 2 Drawing Figures

HIGH DENSITY INFORMATION RECORDS MADE OF CONDUCTIVE RESIN COMPOSITIONS COMPRISING A SPECIFICALLY-TREATED VINYL CHLORIDE-BASE RESIN

BACKGROUND OF THE INVENTION

1. Field of the Invention

This invention relates to information recording and more particularly, to high density information records of a variable electrostatic capacitance form, such as video or audio discs, on which signal information is recorded as geometric variations.

2. Description of the Prior Art

In certain information playback systems of the electrostatic capacitance type, signal information is recorded as geometric variations or pits in a spiral plane or groove or in concentric planes or grooves by compression molding a conductive resin composition between stampers having modulated ridges on the surfaces thereof, thereby obtaining a disc with an impression of the stampers therein as signal information.

The individual geometric variations or pits of the disc are very small and are arranged in a very high density. When the geometric variations are traced with a pickup stylus such as of diamond having an electrode, capacitive variations are established between the stylus and the disc due to the geometric variations therein, thereby playing back pictures and sounds. Typical of the playback system is a video disc of the electrostatic capacitance type.

Such a disc should have various good characteristics or properties such as signal-to-noise ratio showing a reproduction level of signal, durability against repeated cycles of reproduction, mechanical strength, heat stability, humidity proof and the like, so that the performance of the disc is maintained over a long term. To satisfy the above requirements, various conductive resin compositions for discs and molding techniques have been heretofore proposed. At present, it is generally accepted that resin compositions comprising vinyl chloride resins, carbon black with a large surface area and, if necessary, stabilizers, lubricants and the like are most preferable from the practical standpoint. Molding techniques of making discs from these resin compositions are advancing but a serious problem remains in making of the disc in that fine defects such as sharp projections, gentle blisters and the like (hereinafter referred to simply as blister) are formed on the surfaces of the disc.

As mentioned before, signal information is impressed in the disc as fine geometric variations of very high density. For instance, 50 billions of signal pits each with a depth of 0.3 of 0.4 $\mu$m are impressed with a track pitch of 1.35 $\mu$m. The pits are concentrically or spirally arranged in a disc surface with the innermost track turn having a diameter of 9 cm and the outermost track turn having a diameter of 25 cm. Adjacent pits have intervals of about 0.6 $\mu$m at the innermost track turn and of about 1.7 $\mu$m at the outermost track turn. Thus, geometric variations are very fine. When blisters are formed on the disc surface, formation of signal pits are adversely affected with the smoothness of the disc surface being impeded. This presents a serious problem in the fabrication of video or digital audio discs. More particularly, during playback of recorded signal information, a diamond stylus having an electrode is slidably contacted with the concentrically or spirally arranged signal pits while controlling by tracking signals as proposed by Victor Company of Japan, Limited or is slidably contacted with a spiral groove in which signal information is impressed at the bottom thereof as proposed by RCA Co., Ltd. U.S.A. The relative velocity of the stylus and the disc reaches as high as 10 m/second. If the disc has blisters thereon, the stylus will jump at the portion of blisters from the disc surface. Signal information cannot be accurately picked up, leading to a defect of a reproduced picture or image (hereinafter referred to dropout). Alternatively, the jumped stylus may scrape off part of the disc body upon contact with the disc surface, so that signals contained in the scraped-off portion are erased, thereby increasing dropouts or generating dust which is unfavorable for the disc. In an extreme case, when the stylus drops on the disc after the jumping, it may move toward the direction right-angled with the tangential direction of the portion where dropped thereby dropping out signals jumped or skipped over.

The dropouts caused by a failure in formation of only a small amount of signals or by very small-size blisters with several $\mu$m may be recovered by electrical correction of a reproducing apparatus. However, dropouts resulting from blisters of a size larger than 10 $\mu$m are very difficult to correct electrically. In practical applications, it is necessary to solve the problem of blisters.

A number of factors will take part in formation of blisters. Resin compositions used as starting materials for disc include vinyl chloride-base resins, carbon black, heat stabilizers for preventing thermal decomposition of the resin, flow regulators for improving moldability or processability, molding aids, and/or lubricants permitting smooth contact between disc and pickup stylus. These compositions are uniformly mixed in a high speed mixer, kneaded in melted state, pelletized and compression molded by extrusion or injection compression molding to obtain discs.

Blisters of the thus obtained disc may be derived, for example, from the materials of the resin composition, materials incorporated during the fabrication process, or materials produced by thermal decomposition. Blisters derived from inorganic matters may be reduced by removing foreign solid matters from the fabrication system or treating inorganic materials, e.g. carbon black, by a suitable manner. By this, it was possible to reduce blisters to an extent. However, not larger than about 100 blisters derived from organic matters per disc were still found. Organic matters constituting the blisters may be derived from various sources such as vinyl chloride resins, and various organic additives such as dispersants, lubricants and the like. Of these, foreign matters contained in vinyl chloride resins were found to be most serious.

In ordinary applications, the permissible number of foreign matters in vinyl chloride resin is 100 to 1000 per 100 g of the resin. For applications to video or digital audio discs, such number should be as small as from 0.01 to 1 per 100 g of the resin.

SUMMARY OF THE INVENTION

It is accordingly an object of the invention to provide high density information records which are much reduced in dropout defects when played back and have thus excellent reproduction characteristics.

It is another object of the invention to provide high density information records which do rarely cause flying or jumping of playback stylus.

It is a further object of the invention to provide high density information records which have substantially no blister defects thereon.

The present invention is characterized by use of a vinyl chloride resin obtained by suspension polymerization in which an aqueous solution of a water-soluble polymer dispersant is used after removal of insoluble matters from the aqueous solution whereby the resulting vinyl chloride resin includes little organic foreign matters therein. According to the invention, there is provided a high density information record of the electrostatic capacitance type which comprises a record substrate on which signal information is recorded as geometric variations and which is made of a conductive resin composition comprising a vinyl chloride resin and a conductive powder, the vinyl chloride resin being obtained by suspension polymerization of starting vinyl chloride monomer in an aqueous solution of a water-soluble polymer dispersant from which insoluble organic matters with sizes over 10 μm have been removed.

DETAILED DESCRIPTION AND PREFERRED EMBODIMENTS OF THE INVENTION

Figure 1:
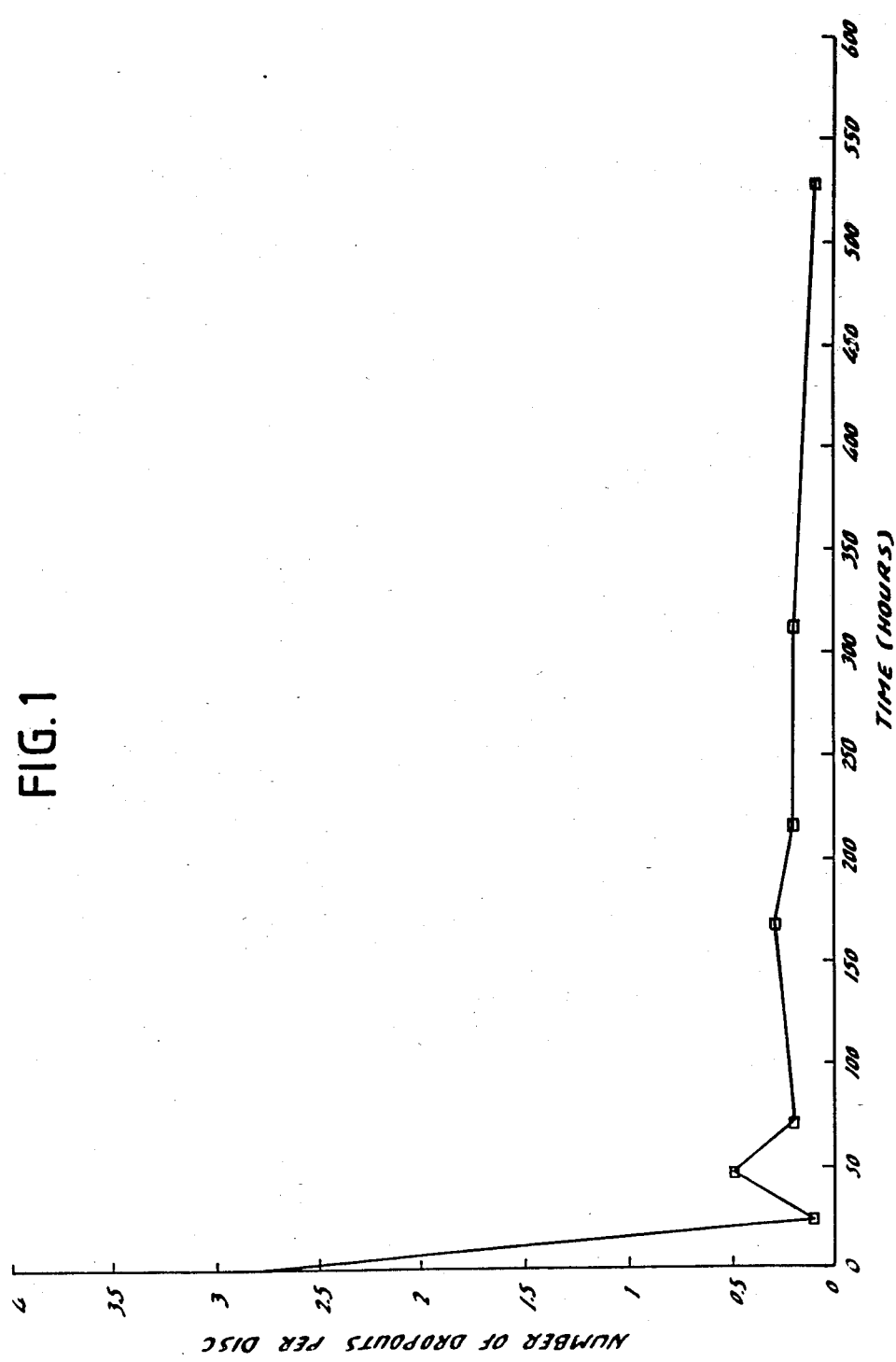
FIGS. 1 and 2 are graphical representations of the relation between the number of dropouts and reproduction time of video discs of the invention and for comparison, respectively.

As is well known, vinyl chloride resin is usually prepared by suspension polymerization. In the suspension polymerization, starting monomer is dispersed as droplets along with a polymerization initiator in an aqueous solution of a water-soluble high molecular weight suspension stabilizer such as gelatin, polyvinyl alcohol or the like. The monomer is polymerized while violently agitating the reaction system.

We made extensive studies on the suspension polymerization to prepare a starting vinyl chloride resin which can yield discs free of blisters. In the studies, scales on walls of a polymerization vessel were completely removed with use of organic solvents. Ion-exchanged water, starting vinyl chloride monomer or other copolymerizable monomers, and the like were filtered to remove foreign matters therefrom. Alternatively, great care was paid to the steps of withdrawing the polymerization slurry and dehydrating and drying the polymer in order to avoid incorporation of foreign matters in the polymer. However, blisters derived from organic matters were not reduced in number.

Although oil-soluble polymers or surface active agents may be used in combination with water-soluble polymeric compounds as suspension stabilizers for production of vinyl chloride resins, it is essential to use water-soluble polymeric compounds for these purposes. The type of water-soluble polymeric compound depends on the type or quality of vinyl chloride resin.

In the practice of the invention, vinyl chloride resins used to make video or digital audio discs should have good melt fluidity, good thermal stability and good mechanical strength. For this purpose, suitable vinyl chloride resins should have a degree of polymerization of 350 to 600. Vinyl chloride resins suitable for the purpose of the invention include, for example, vinyl chloride homopolymer, copolymers of vinyl chloride with vinyl acetate, ethylene, propylene, alpha-olefins such as 1-octene, 1-hexene or the like, acrylate monomers such as ethyl acrylate, 2-ethylhexyl acrylate, n-butyl acrylate, methyl acrylate or the like, and ethylene-vinyl acetate copolymers grafted with vinyl chloride. Where copolymers are used, co-monomers should preferably have a content of below 25 wt%.

A number of water-soluble polymer compounds used to prepare vinyl chloride resins having such properties as mentioned above and having a degree of polymerization of 350 to 600 are known. It is usual to use water-soluble polymers having high dispersability such as partially saponified polyvinyl acetates, cellulose derivatives, sodium polyacrylates and the like. A number of partially saponified polyvinyl acetates are known which are different in molecular weight, degree of saponification and content of other components. Likewise, cellulose derivatives with different molecular weights and different types and amounts of substituents are known. Moreover, a number of sodium polyacrylates having different molecular weights are known. These polymers are properly used singly or in combination in the practice of the invention. In general, these suspension dispersants may be used after preparation of its aqueous solution or may be used by dissolving directly in water used for the polymerization such as in an autoclave. In order to achieve a stable dispersion effect or avoid a fish-eye problem, it is preferable that such dispersants are first dissolved in water and then mixed with water in the system.

To confirm the influences of dispersants on formation of blisters, we have made tests as follows.

First, partially saponified polyvinyl acetate is dissolved in filtered ion-exchanged water at 25° to 30° C. to make a 1 wt% aqueous solution. During the dissolution, care is paid so that no foreign matters are incorporated in the solution. This aqueous solution is placed in a clean 500 ml flask for visual observation of insoluble matters in the solution from outside but is found to be a uniform transparent aqueous solution. Subsequently, this aqueous solution is heated to about 70° C. at which polymerization of vinyl chloride is ordinarily performed. As a result, thermal coagulation takes place with insoluble matters appearing as flocs. The flocs are again dissolved completely when the solution is cooled, thereby giving a transparent aqueous solution.

Next, the transparent aqueous solution is filtered through a membrane filter having a pore size of 1 μm. When the filter is observed through a microscope, 100 to 1000 fine particles swollen with water per gram of the dispersant are found thereon. Simultaneously, metallic or other foreign matters which are not visually found are also observed. This is true of cellulose derivatives and sodium polyacrylates.

From the above, it will be assumed that the swollen particles may cause blisters upon fabrication of discs. Moreover, in order to prevent incorporation of metallic or foreign matters, filtration of the aqueous solution is considered to be necessary. When water-soluble polymer suspension stabilizers or dispersants are used after dissolution in water and filtration at a normal temperature, little or no blisters are formed on or in high density information discs of the resulting vinyl chloride resin.

Water-soluble suspension stabilizers may be those which are ordinarily used for suspension polymerization of vinyl chloride and include, aside from the afore-indicated partially saponified polyvinyl acetates, cellulose derivatives and sodium polyacrylates, styrene-maleic anhydride copolymer, vinyl acetate-maleic anhydride copolymer and the like. These water-soluble polymers are generally dissolved in water at a concentration of 0.01 to 20 wt% and are added to a reaction system to have a concentration of 0.001 to 10 wt%. Because the aqueous solution of the stabilizer is very viscous, e.g. 1 to 100,000 poises, filters used for this purpose may be a filter made of superposed non-woven fabric layers of fine fibers, a cylindrical filter made of fine fiber windings, or filters made of fine metal, resin or glass particles bonded together. These filters are advantageous because they are readily exchangeable with fresh ones. The openings of the filter are preferred to be as small as possible. For filtration of an aqueous solution of relatively high viscosity, it is convenient that the opening is in the range of from 1 to 10 μm so that insoluble organic matters with a size over 10 μm are removed.

With sodium polyacrylates, they have affinity for glass fibers. As compared with a polypropylene filter, it takes a much longer time for the filtration when using a glass fiber filter with the same opening as the polypropylene filter. In practical applications, the opening should be determined depending on the type of water-soluble polymer and the type of filter material.

According to the the invention, vinyl chloride monomer may be polymerized under ordinary polymerization conditions using ordinary polymerization initiators as particularly described hereinafter. Preferably, ion-exchanged water, vinyl chloride monomer and polymerization initiators are also filtered to remove foreign matters therefrom.

For fabrication of high density information records of the invention, the vinyl chloride resins thus obtained are mixed with a conductive powder such as carbon black, fine metal powders, or the like in an amount of 5 to 30 wt% based on the resin, thereby obtaining a conductive resin composition. The conductive resin composition may further comprise additives ordinarily used for these purposes, such as lubricants, thermal stabilizers, and the like. Mixing, kneading, pelletizing and compression molding of the conductive resin composition can be effected as usual and are not described herein.

The present invention is described in detail by way of preparatory example, examples and comparative examples.

PREPARATORY EXAMPLE 1

Preparation of Vinyl Chloride Resins Used in the Present Invention

Vinyl chloride was polymerized with or without copolymerizable monomers in a 600 liters autoclave equipped with a jacket and an agitator. Scales deposited on the inner surfaces of the autoclave were removed by a scraper and tightly sealed. Methylene chloride was filled in the autoclave and then heated to 40° C., followed by agitation for 1 hour. Subsequently, the methylene chloride was withdrawn and pressurized water with a pressure of 60 kg/cm$^2$G was injected into the autoclave to completely remove the scales therefrom. Ion-exchanged water which passed through a filter having openings of 0.5 μm was charged into the autoclave for washing.

Ion-exchanged water used for the polymerization was filtered with the same type of filter as used above. Vinyl chloride monomer and copolymerizable monomers were each filtered with a filter having openings of 1 μm. A suspension stabilizer for the polymerization was dissolved in the ion-exchanged water to make a 2 wt% aqueous solution, followed by filtering with a filter having openings of 1 μm.

A polymerization initiator was filtered with a filter with openings of 1 μm.

The polymerization reaction was carried out as follows. The ion-exchanged water was charged into the washed autoclave, into which were further charged predetermined amounts of the suspension stabilizer and the polymerization initiator while filtering. Thereafter, the autoclave was tightly sealed, after which the air in the system was evacuated to an internal pressure of 35 mmHg, followed by charging vinyl chloride monomer while agitating. The system was heated to a temperature of polymerization at which the polymerization reaction started. Thereafter, the system was cooled, under which the reaction was caused to proceed. At the time when the rate of polymerization reached about 70%, the temperature of the content was lowered down to 65° C. and remaining vinyl chloride monomer was recovered. The internal pressure was reduced to 0 Kg/cm$^2$G, after which 2 m$^3$/hour of nitrogen gas was introduced from the bottom of the autoclave for 2 hours while passing through a filter having openings of 0.5 μm and discharged from the upper portion of the autoclave in order to eliminate the remaining vinyl chloride monomer from the system. Then, the internal pressure was raised to 1 Kg/cm$^2$G.

The resulting slurry of vinyl chloride polymer was discharged through a 42 mesh metal sieve under the pressure of the nitrogen in the autoclave into a 1000 liters container which had been washed with filtered ion-exchanged water and which had a discharge nozzle and an agitator.

The slurry was dehydrated and dried with a centrifugal dewatering machine and a conical dryer installed in a room, which was pressurized with clean air passed through an HEPA filter, in such a way that no dust was incorporated in the product. As a result, fine particles of the vinyl chloride resin were obtained. The polymerization conditions and compositions of vinyl chloride resins prepared in the same manner as described above are shown in Table 1 below.

TABLE 1

| Experiment No. | 1 | 2 | 3 | 4 |
|---|---|---|---|---|
| Composition | vinyl chloride homo-polymer | vinyl chloride homo-polymer | vinyl chloride/ ethylene copoly-mer | vinyl chloride/ vinyl acetate copoly-mer |
| Ion-exchanged water | 298 Kg | 290 Kg | 290 Kg | 290 Kg |
| Vinyl chloride monomer | 200 Kg | 200 Kg | 190 Kg | 190 Kg |
| Co-monomer | — | — | 10 Kg | 10 Kg |
| Polymerization initiator (Note 1) | 160 g | 160 g | 180 g | 180 g |
| Partially saponified polyvinyl acetate (Note 2) | 600 g | — | 1100 g | 1100 g |
| Hydroxypropyl methyl cellulose | — | 800 g | — | — |
| Polymerization temperature | 80° C. | 80° C. | 77° C. | 74° C. |
| Polymerization time | 8.5 hrs. | 8.5 hrs. | 9.0 hrs. | 9.5 hrs. |
| Content of co-monomer in the final product | — | — | 2.1% | 7.8% |
| Size distribution | | | | |
| 42 mesh pass (%) | 99 | 99 | 99 | 99 |
| 100 mesh pass (%) | 78 | 50 | 80 | 60 |
| 200 mesh pass (%) | 11 | 3 | 15 | 4 |

TABLE 1-continued

| Experiment No. | 1 | 2 | 3 | 4 |
|---|---|---|---|---|
| Apparent density | 0.5 | 0.53 | 0.49 | 0.55 |

(Note 1) Polymerization initiator: Kaya ester O, available from Kayaku Noury Co., Ltd.
(Note 2) Partially saponified polyvinyl acetate: Gosenol KH-17 available from The Nippon Synthetic Chem. Ind. Co., Ltd.
(Note 3) Hydroxypropyl methylcellulose: Metollose 90SH100 available from Shinetsu Chem. Co., Ltd.

PREPARATORY EXAMPLE 2

Preparation of Vinyl Chloride Homopolymers for Comparison

The same compositions as in Experiment Nos. 1 and 3 were polymerized in the same manner as in Preparatory Example 1 except that aqueous solutions of the partially saponified polyvinyl acetate and hydroxypropyl methyl cellulose suspension stabilizers were used without filtration, thereby obtaining fine particles of the resins. The characteristics of the resins were shown in Table 2.

TABLE 2

| Experiment No. | 5 | 6 |
|---|---|---|
| Composition | Vinyl chloride homopolymer | |
| Degree of polymerization | 480 | 480 |
| Size distribution | | |
| 42 mesh pass (%) | 99 | 99 |
| 100 mesh pass (%) | 86 | 48 |
| 200 mesh pass (%) | 13 | 3 |
| Apparent density | 0.53 | 0.53 |
| Remarks | Corresponding to Experiment No. 1 | Corresponding to Experiment No. 2 |

EXAMPLES 1-4

One hundred parts by weight of each of the resins obtained in Experiment Nos. 1 through 4, 7 parts by weight of dibutyl tin mercapto ester stabilizer (STANN JF-95, made by Sankyo Organic Chemicals Co., Ltd.), 2.0 parts by weight of a fatty acid-glycerine ester lubricant (RES-210, made by Riken Vitamin Co., Ltd.), 0.5 part by weight of an alkyl ester of fatty acid (Splendor E-10, made by Kao Soap Co., Ltd.), and 1.0 part by weight of dimethylpolysiloxane (RES-421, made by Sinetsu Chem. Co., Ltd.) were mixed in a Henschel mixer to a temperature of 110°, followed by operating the mixer at a low speed so that the temperature was lowered down to 70° C. To the mixture was added 20 parts by weight of conductive carbon black (Ketjen Black EC, made by Japan EC, Ltd), followed by heating again to 110° C. and agitating at a high speed for 15 minutes. Thereafter, the mixture was cooled down to room temperature.

The mixture was pelletized by means of a kneader, PR-46 made by Buss Co., Ltd. Switzerland. The resulting pellets were subjected to a metal separator to remove metals from the pellets or metal-containing pellets and pressed by a video disc press to obtain video discs.

COMPARATIVE EXAMPLES 1 AND 2

The general procedure of Examples 1 through 4 was repeated using the resins obtained in Experiment Nos. 5 and 6, thereby obtain video discs.

Ten video discs of each example were provided and subjected to measurement of the number of dropouts using a dropout counter. The average number of dropouts for each disc was divided into three groups, i.e. over 3H, 2H-3H and below 2H. The term "dropout 1H" means a deficiency corresponding to one scanning line on a television. Accordingly, dropout 2H means a deficiency corresponding to two scanning lines. Dropouts below 3H can be fully recovered or corrected by electrical processing in a reproducing apparatus. In this sense, dropouts over 3H cannot be overlooked.

As a result of the measurement, it was found that the video disc of the present invention involved as small as 3 dropouts/disc over 3H immediately after the press molding. The number of dropouts was very small even after a long reproduction time as will be clearly seen from FIG. 1.

Moreover, the average number of dropouts of 2H-3H is 9.5/disc and the average number of dropouts of below 2H is 10/disc, thus being remarkably reduced.

Figure 2:
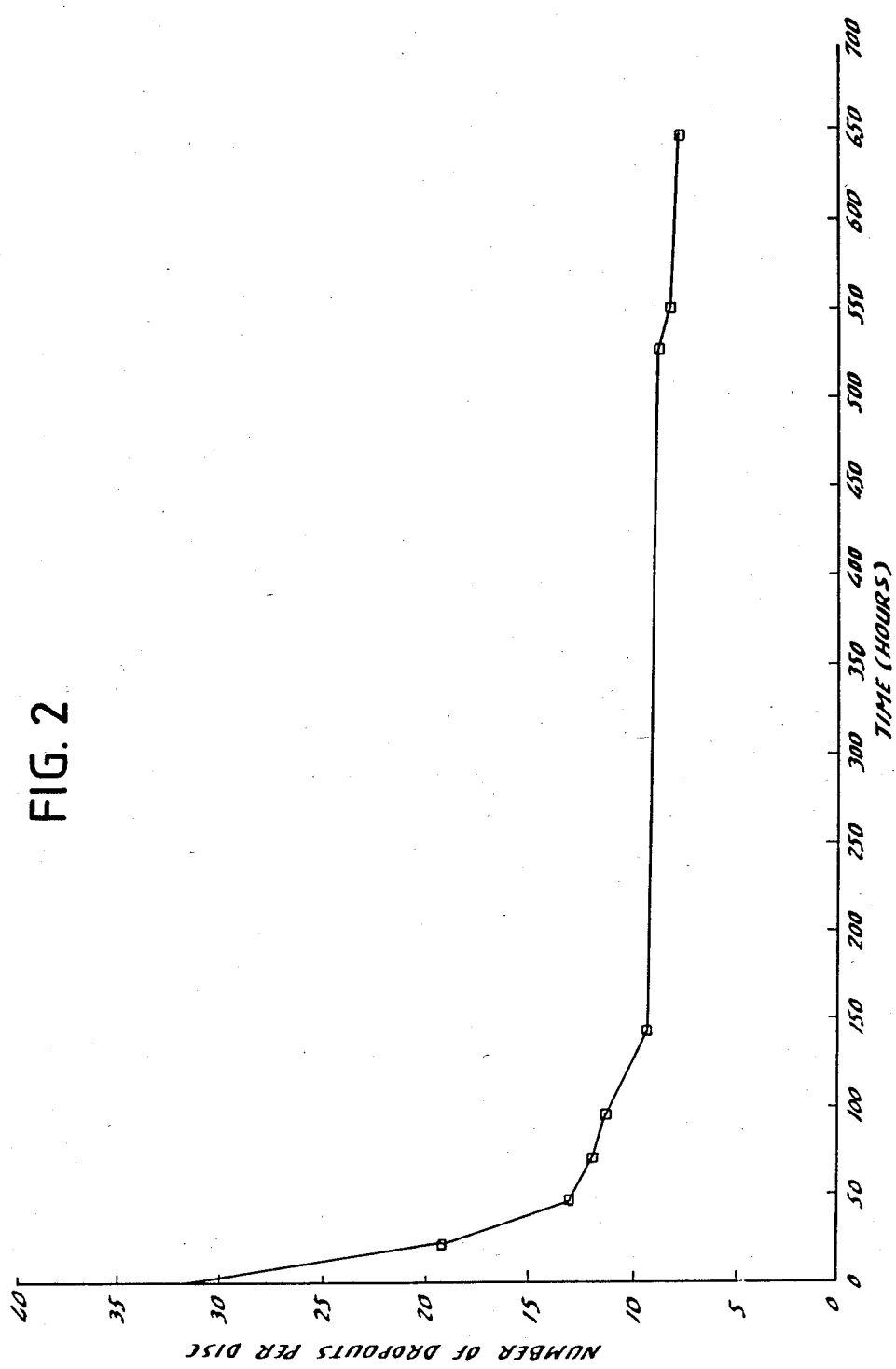

In contrast, the video discs obtained in Comparative Examples 1 and 2 involved as many as 30 dropouts/disc over 3H immediately after the press molding. The number of dropouts was not so reduced after the long-term reproduction as will be seen from FIG. 2. 18 dropouts/disc of 2H-3H were found with 65 dropouts/disc of below 2H being found.

What is claimed is:

1. A high density information record of the electrostatic capacitance type which comprises a record substrate on which signal information is recorded as geometric variations, said substrate being made of a conductive resin composition comprising a vinyl chloride resin and a conductive powder, the vinyl chloride resin being obtained by suspension polymerization of vinyl chloride monomer in an aqueous solution containing a water-soluble polymer suspension stabilizer from whch insoluble organic matters with sizes over 10 μm have been removed.

2. The high density information record according to claim 1, wherein said vinyl chloride resin has a degree of polymerization of 350 to 600 and is vinyl chloride homopolymer.

3. The high density information record according to claim 1, wherein said vinyl chloride resin is a copolymer of vinyl chloride and vinyl acetate, ethylene, propylene, alpha-olefin or acrylate monomer.

4. The high density information record according to claim 1, wherein said vinyl chloride resin is a copolymer of ethylene and vinyl acetate grafted with vinyl chloride.

5. The high density information record according to claim 1, wherein said insoluble organic matters are removed from said stabilizer by filtration.

6. The high density information record according to claim 1, wherein said conductive power is carbon black powder.

7. The high density information record according to claim 1, wherein said conductive powder is used in an amount of from 5 to 30 wt% based on said vinyl chloride resin.

8. The high density information record according to claim 1, wherein said water-soluble polymer suspension stabilizer is present in an amount of 0.001 to 10 wt%.

9. The high density information record according to claim 8 wherein said suspension stabilizer is selected from the group consisting of partially saponified polyvinyl acetates, cellulose derivatives, sodium polyacrylates, styrene-maleic anhydride copolymers and vinyl acetate-maleic anhydride copolymers.

* * * * *